United States Patent [19]

Maki et al.

[11] Patent Number: 4,970,862
[45] Date of Patent: Nov. 20, 1990

[54] HYDRAULIC CONTINUOUSLY VARIABLE SPEED TRANSMISSION

[75] Inventors: Kazuya Maki, Aichi; Takeo Suzuta; Kouji Yamaguchi, both of Saitama, all of Japan

[73] Assignee: Honda Giken Kogyo Kabushiki Kaisha, Tokyo, Japan

[21] Appl. No.: 251,549

[22] Filed: Sep. 30, 1988

[30] Foreign Application Priority Data

Oct. 13, 1987 [JP] Japan ............................ 62-257770

[51] Int. Cl.$^5$ ............................................. F16H 61/40
[52] U.S. Cl. ...................................... 60/468; 60/487; 60/327
[58] Field of Search ................ 180/307; 60/327, 445, 60/448, 449, 459, 468, 469, 487, 488, 489, 494

[56] References Cited

U.S. PATENT DOCUMENTS

| | | | |
|---|---|---|---|
| 3,913,697 | 10/1975 | Greene | 180/307 X |
| 4,170,153 | 10/1979 | Mizuno | 74/868 |
| 4,180,979 | 1/1980 | Cornell | 60/911 X |
| 4,253,347 | 3/1981 | Mizuno | 74/862 |
| 4,261,229 | 4/1981 | Mizuno | 74/866 |
| 4,509,125 | 4/1985 | Fattic | 364/424.1 |
| 4,648,496 | 3/1987 | Petzold et al. | 192/0.076 |
| 4,693,081 | 9/1987 | Nakamura et al. | 60/445 X |
| 4,776,165 | 10/1988 | Iino | 60/431 |
| 4,782,934 | 11/1988 | Takano et al. | 192/0.073 |

FOREIGN PATENT DOCUMENTS

| | | |
|---|---|---|
| 0240178 | 6/1987 | European Pat. Off. . |
| 880797 | 8/1953 | Fed. Rep. of Germany . |
| 95722 | 3/1981 | Japan . |
| 37540 | 9/1986 | Japan . |
| 207229 | 9/1986 | Japan . |
| 127562 | 6/1987 | Japan . |

Primary Examiner—Edward K. Look
Assistant Examiner—George Kapsalas
Attorney, Agent, or Firm—Lyon & Lyon

[57] ABSTRACT

A hydraulic continuously variable speed transmission includes means for detecting a speed reduction ratio of said continuously variable speed transmission, means for detecting an accelerator opening, and means for detecting vehicle speed. During running, when the means for detecting the accelerator opening detects that the accelerator opening has been fully closed, the means for detecting speed the reduction ratio detects the speed reduction ratio at the moment, and then an operation initiating vehicle speed of said clutch valve is determined based on the detected speed reduction ratio, and when the vehicle speed detected by the means for detecting vehicle speed is reduced to the operation initiating vehicle speed, the clutch valve starts to open.

8 Claims, 7 Drawing Sheets

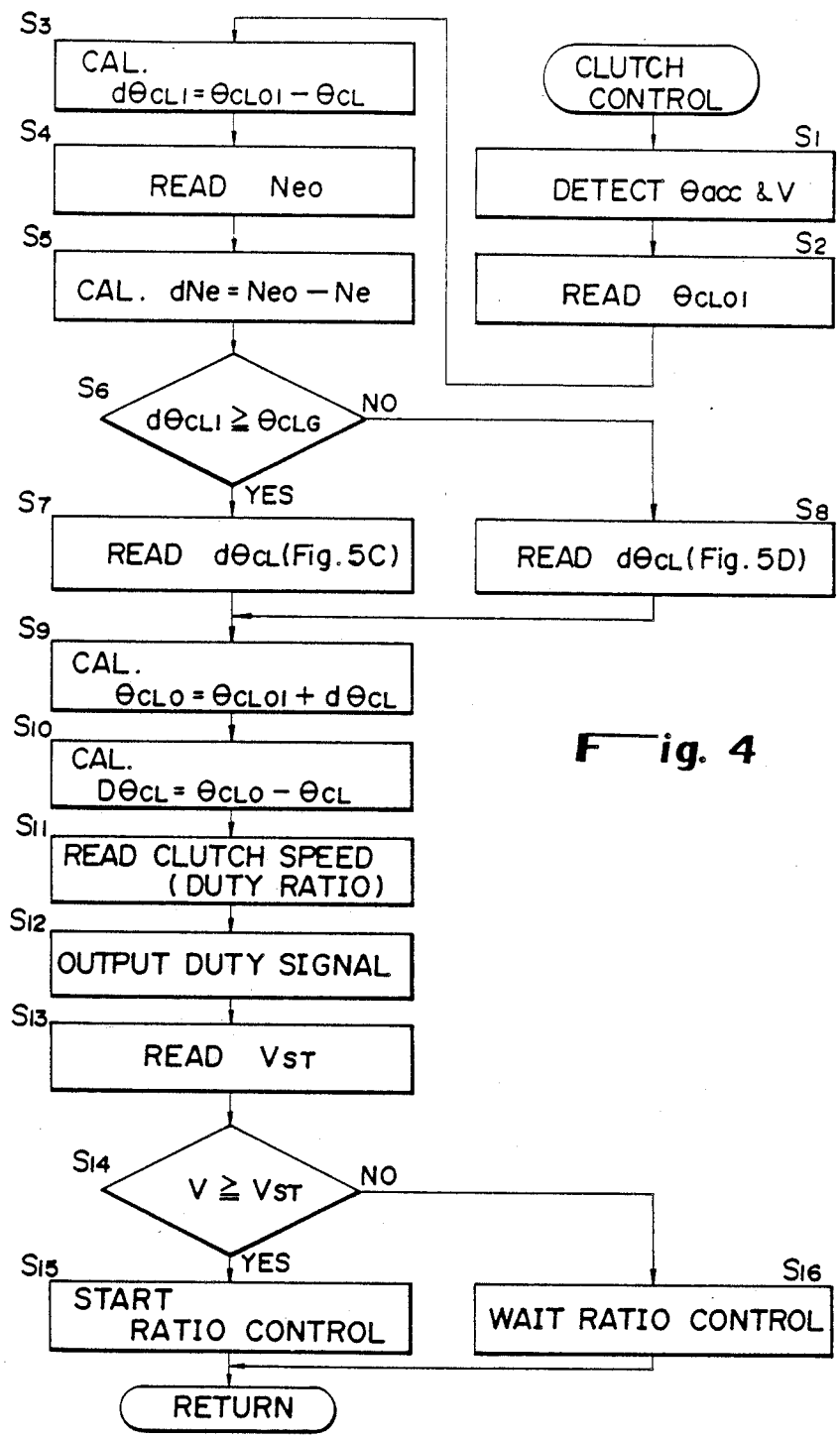

Fig. 5A
| Vacc \ V | 0 | 5 | 10 | 15 | 20 | 25 | 30 |
|---|---|---|---|---|---|---|---|
| 80° | 0° | | | | 90° | ← | |
| 60° | 0° | | | | 90° | ← | |
| 40° | 0° | | | | 90° | ← | |
| 30° | 0° | | | | 90° | ← | |
| 20° | 0° | | | | 90° | ← | |
| 15° | 0° | | | 90° | ← | | |
| 10° | 0° | | 90° | ← | | | |
| 5° | 0° | 90° | ← | | | | |
| 0° | 0° | 90° | ← | | | | |
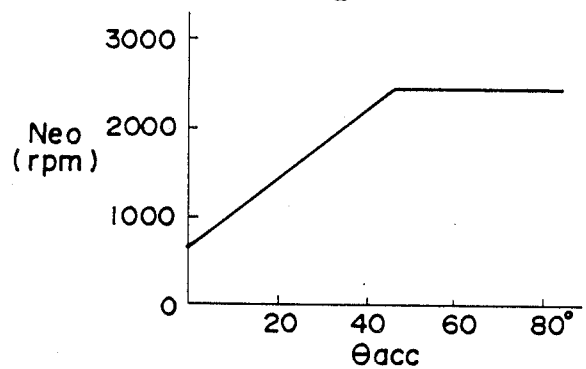
Fig. 5B
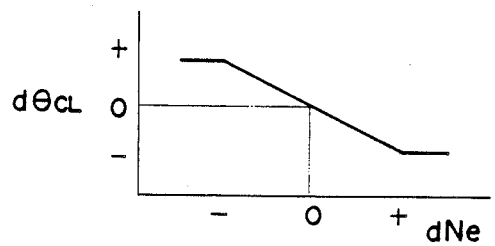
Fig. 5C

HYDRAULIC CONTINUOUSLY VARIABLE SPEED TRANSMISSION

BACKGROUND OF THE INVENTION

The present invention relates to a continuously variable transmission comprising a hydraulic pump and a hydraulic motor.

With a continuously variable speed transmission comprising a closed circuit disposed between a hydraulic pump and a hydraulic motor at least one of which is of variable displacement type, as disclosed in the Japanese Patent laid-open Publication No. 56(1981)-95722, a bypass line is provided between the pump and motor to communicate two hydraulic lines which constitute the closed circuit, and the transmission is clutch controlled by opening and closing the bypass line with a opening control valve (clutch valve).

In a vehicle having such a continuously variable speed transmission mounted thereon, when the opening of the accelerator pedal is brought to zero with the operator's foot released, such control has been adopted as to prevent engine stall by opening the clutch valve when vehicle speed falls below a given value.

In such control as described above, to prevent engine stall for instance, even when quick braking is applied in the minimum speed reduction ratio (top condition), it is necessary to set somewhat higher the vehicle speed at which the clutch valve starts to open.

The high vehicle speed for starting the clutch actuation may be desirable in preventing engine stall at such a case as described above particularly for a quick stop. However, in a case where the vehicle is decelerated slowly, when the accelerator is depressed while the vehicle is still running, the engine speed is increased abruptly, thus resulting in an uncomfortable running condition. This takes place for the following reason: even with the clutch valve having been opened, in the running vehicle, the hydraulic motor in a continuously variable speed transmission is rotating corresponding to the wheel rotation and is drawing the delivered hydraulic oil from the hydraulic pump, thus reducing the engine load required to drive the pump. Therefore, the engine speed tends to be increased rapidly in response to the depression of the accelerator pedal.

SUMMARY OF THE INVENTION

It is an object and purpose of the invention to provide a clutch control for a continuously variable speed transmission that can prevent an abrupt increase in the engine speed caused by a depression of the accelerator pedal during a slow deceleration.

It is another object and purpose of the invention to provide a clutch control for a continuously variable speed transmission that can also prevent engine stall in a rapid deceleration of vehicle speed.

To achieve the above objects, a continuously variable speed transmission according to the invention is provided with means for detecting a speed reduction ratio, means for detecting an accelerator opening and means for detecting vehicle speed to achieve the following control: During running, when it is detected that the accelerator opening becomes zero (fully closed), the speed reduction ratio at the moment is detected and a vehicle speed for starting the opening actuation of a clutch valve is determined based on the detected speed reduction ratio. Then, when the vehicle speed falls down to the determined vehicle speed for starting the clutch opening actuation, the clutch valve starts to open.

In this context, "accelerator opening" as referred to in the specification and the appended claims means the opening of the accelerator pedal operated by the driver and indicating the driver's intention to accelerate or declerate or the engine throttle opening corresponding to the depression of accelerator pedal. The opening of the accelerator pedal is fully closed when the accelerator pedal is fully released, and is fully opened when the accelerator pedal is fully depressed.

The further scope and applicability of the present invention will become apparent from the detailed description given hereinafter. However, it should be understood that the detailed description and specific examples, while indicating preferred embodiments of the invention, are given by way of illustration only, and various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus do not limit the scope of the present invention wherein:

FIG. 4 is a flow chart illustrating clutch control according to the invention;

FIG. 5A to 5F are a table and graphs used to determine various valves in the flow chart of FIG. 4.

DETAILED DESCRIPTION OF THE PREFERRED EMBODIMENTS

Figure 1:
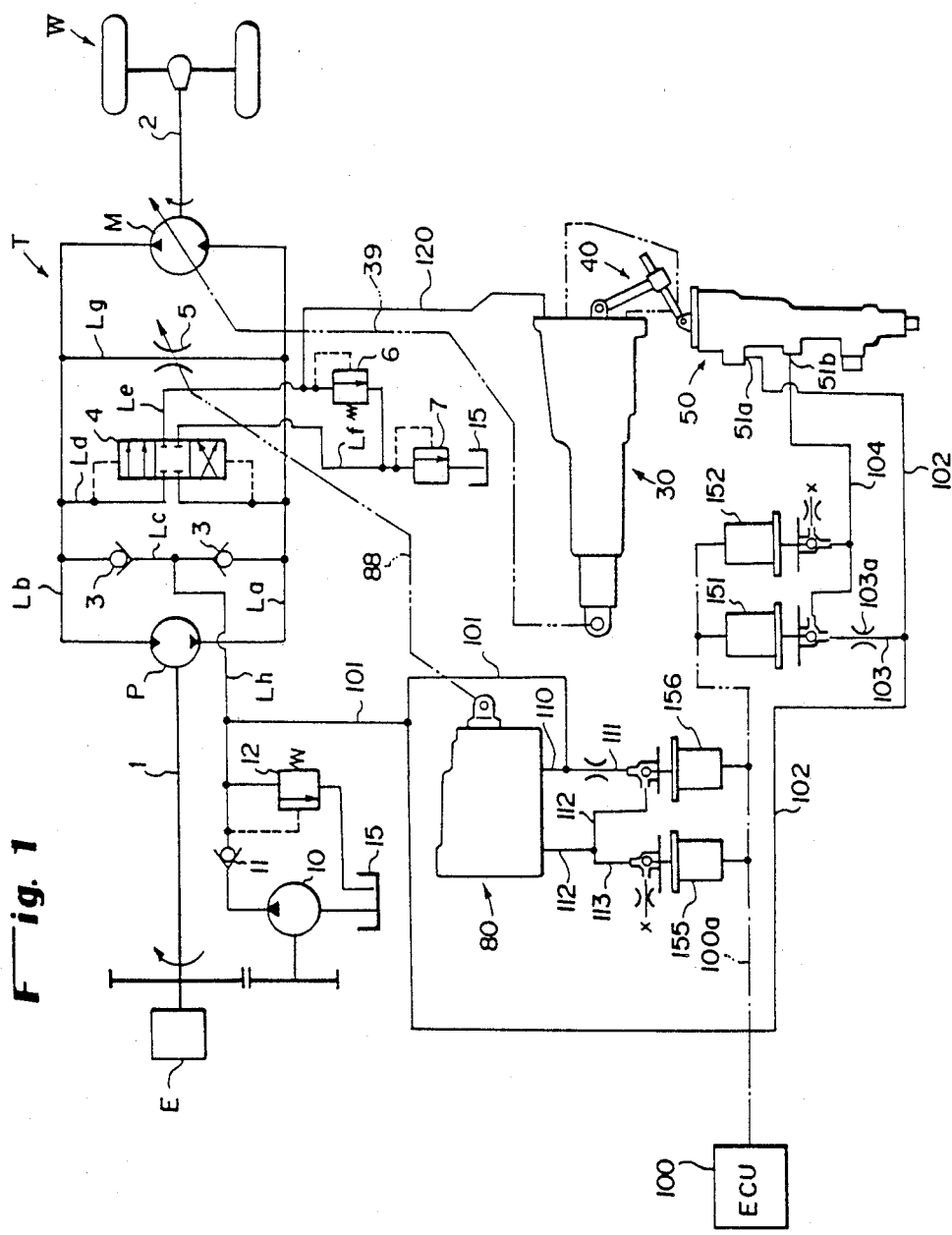
FIG. 1 is a hydraulic circuit diagram of a continuously variable speed hydraulic transmission according to the invention.

A hydraulic circuit diagram of an continuously variable speed transmission with a direct clutch unit in accordance with the present invention is presented in FIG. 1, wherein the continuously variable speed transmission T has a constant displacement swash plate type axial plunger hydraulic pump P driven by an engine E through an input shaft 1 and a variable displacement swash plate type axial plunger hydraulic motor M which drives wheels W through a directional change unit (not shown). The pump P and motor M are connected with each other by means of two hydraulic lines La and Lb comprising a closed hydraulic circuit wherein the first line La connects the pump inlet port to the motor outlet port and the second line Lb connects the pump outlet port to the motor inlet port. The internal pressure of the first line La is high when the engine E drives the wheels W through the pump P and the motor M (the internal pressure of the second line Lb is low at this time). On the other hand, the internal pressure of the second line Lb is high when the engine E is driven by the wheels W creating an engine braking phenomenon (the internal pressure of the first line La is low at this time). The engine braking phenomenon occurs at a deceleration state of the vehicle, for example.

A charge pump 10 is driven by the engine E is connected to the closed circuit through a charge hydraulic line Lh having a check valve 11 and through a third hydraulic line Lc having a pair of check valves 3 and 3. Hydraulic oil pumped up by the charge pump 10 from an oil sump 15 and regulated in its pressure by a charge pressure relief valve 12 is supplied to either of the two hydraulic lines La, Lb which has lower pressure through the check valves 3, 3. A fourth hydraulic line Ld having a shuttle valve 4 is connected to the closed circuit. To the shuttle valve 4 are connected a fifth hydraulic and a sixth hydraulic line which respectively have a high pressure relief valve 6 and a low pressure relief valve 7 and are connected to the oil sump 15. The shuttle valve 4 is a 2-port 3-position selector valve, which is operated in response to a hydraulic pressure difference between the first and second hydraulic lines to connect either of the first and second hydraulic lines La, Lb having the higher pressure to the fifth hydraulic line Le as well as to connect the other of the first and second hydraulic lines having the lower pressure to the sixth hydraulic line Lf. Therefore, the relief pressure of a higher pressure line is regulated by the high pressure relief valve 6, and the relief hydraulic pressure of the other lower pressure line is regulated by the low pressure. relief valve 7.

Between the first and second hydraulic lines La and Lb is provided a seventh hydraulic line Lg to short-circuit the closed hydraulic circuit, that is, to short-cut the two lines. The seventh hydraulic line Lg is provided with a clutch valve 5, a variable opening control valve, to control the opening degree of the line. Therefore, the opening control of the clutch valve 5 can effect clutch control to control the transmission of driving force from the hydraulic pump P to the hydraulic motor M.

Actuators provided for displacement control of the hydraulic motor M to control the speed reduction ratio of the continuously variable speed transmission T are a first and a second ratio control servo unit 30, 50 which are connected with each other by means of a link mechanism 40. The hydraulic motor M is of a swash plate axial piston type, and its displacement is changed by the control of the swash plate angle by means of the ratio control servo units 30, 50. The operation of the clutch valve 5 is controlled by a clutch servo unit 80.

The operation of the ratio control servo units 30, 50 and the clutch servo unit 80 is controlled by respective pairs of solenoid valves 151, 152 and solenoid valves 155, 156 which are duty-ratio-controlled by signals from a controller 100. The controller 100 receives signals corresponding to the vehicle speed V, the engine speed Ne, the throttle opening $\theta$th, the swash plate slant angle $\theta$th of the hydraulic motor M, and the accelerator pedal opening $\theta$acc operated by the driver. Based on these signals, the controller 100 outputs signals for controlling the above solenoid valves so as to effectuate desirable vehicle traveling control.

The structures and operations of the servo units 30, 50 and 80 are described in detail below.

Figure 2:
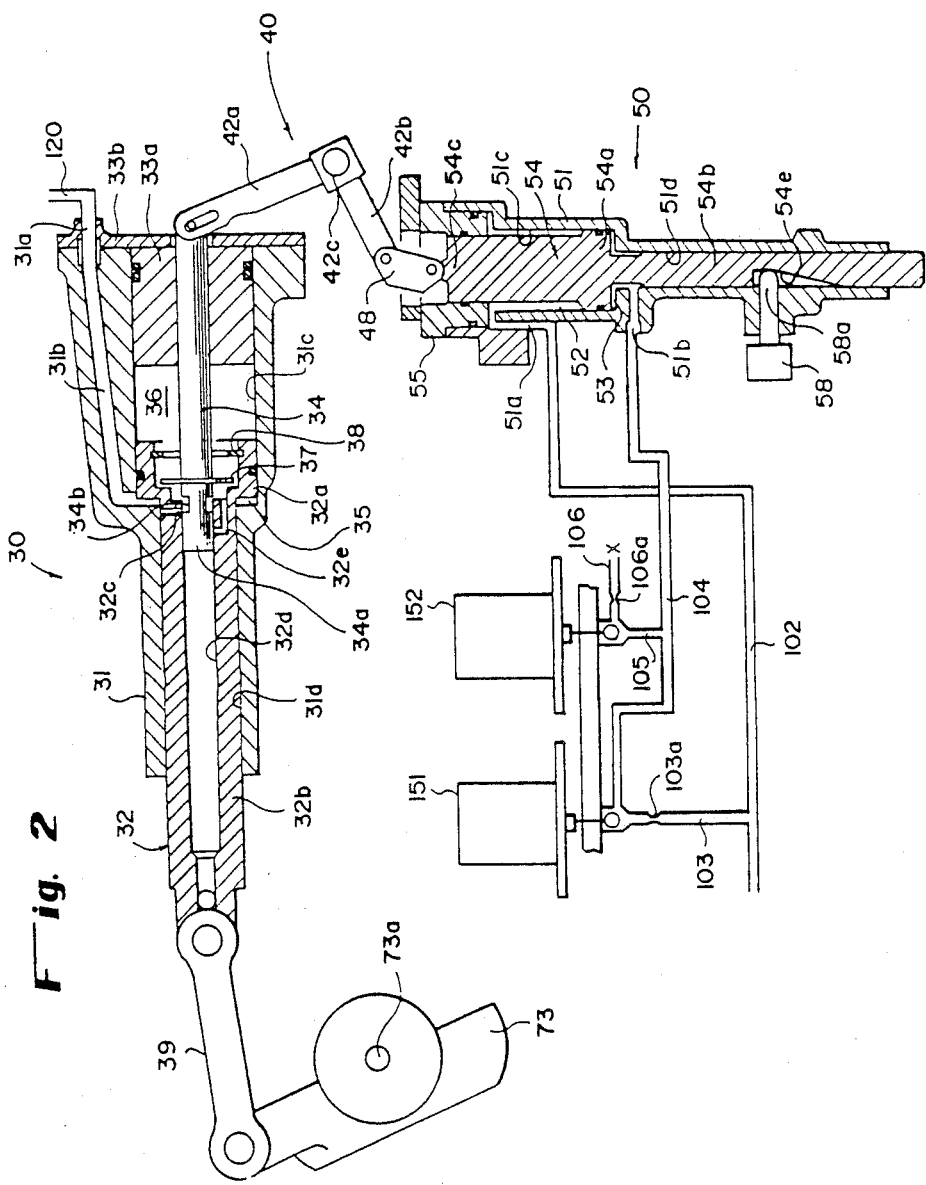
FIG. 2 is a sectional view of first and second servo units for ratio control.

Referring first to the ratio control servo units 30, 50 shown in FIGS. 1 and 2, the first ratio control servo unit 30 controls the swash plate angle of the hydraulic motor M by the help of the high hydraulic pressure fed from the closed hydraulic circuit of the transmission T through the shuttle valve 4, the fifth hydraulic line Le and a high pressure line 120. The second ratio control servo unit 50 is connected to the first ratio control servo unit 30 by a link mechanism 40 and controls the operation of the first ratio control servo unit 30.

The first ratio control servo unit 30 comprises a housing 31 having a connection port 31a connected to the high pressure line 120, a piston member 32 slidably inserted into the housing 31, and a spool member 34 slidably and coaxially inserted into the piston member 32. The piston member 32 consists of a piston portion 32a formed at its right end and a rod portion 32b coaxially extending leftward. The piston portion 32a is fitted into a cylinder hole 31c of the housing 31 and divides the space inside the cylinder hole 31c into two chambers defining two cylinder chambers 35, 36. The rod portion 32b having a smaller diameter than that of the cylinder hold 31c is inserted into a rod hole 31d which is concentric with the cylinder hole 31c. The right cylinder chamber 36 is covered by a plug member 33a and cover 33b through which the right end of the spool member 34 protrudes.

The high pressure line 120 connected to the port 31a communicates with the left cylinder chamber 35 through a hydraulic line 31b. The piston member 32 is pushed rightward by the hydraulic pressure fed in the left cylinder chamber 35 through the high pressure line 120.

A land portion 34a which is inserted in a spool hole 32d is formed at the left end of the spool member 34. A pair of dents 34b having diagonal planes with fixed axial widths is formed at the right side of the land portion 34a. A stop ring 37 mounted on a spool member 34 hits against a stop ring 38 mounted on the inside surface of the piston member 32 before the spool member 34 comes out.

A drain passage 32e which can connect the right cylinder chamber 35 to the oil sump (not shown) through the spool hole 32d responding to the rightward motion of the spool member 34 and a connection passage 32c which can connect the left cylinder chamber 35 to the right cylinder chamber 36 through the dents 34b responding to the leftward motion of the spool member 34 are formed in the piston member 32.

When the spool member 34 is moved rightward, the land portion 34a blocks the connection passage 32c and opens the drain passage 32e. Accordingly the hydraulic pressure fed through the high pressure line 120 is led into the left cylinder chamber 35 and pushes the piston member 32 rightward so that the piston member 32 follows the spool member 34. When the spool member 34 is moved leftward, the connection passage 32c communicates with the right cylinder chamber 36 through the dents 34b and the drain passage 32e is blocked by the land portion 34a. Accordingly, the high hydraulic pressure is fed to both the left and right cylinder chambers 35, 36. The piston member 32 is pushed leftward because of the difference in areas where pressure is applied and therefore the piston member 32 is moved so as to follow the spool member 34.

When the spool member 34 is held still, the piston member 32 is also held still creating a hydraulic floating state because of a pressure balance between the left and right cylinder chambers 35, 36.

As just discussed, when the spool member 34 is moved leftward or rightward, the piston member 32 is moved laterally so as to follow the spool member 34 with the help of the high hydraulic pressure fed through the high pressure line 120. Accordingly the variable displacement of the motor M is controlled by the motion of the spool member 34 since the piston member 32 is connected to the swash plate 73 of the motor M by means of a link member 39.

The spool member 34 is linked to the second servo unit 50 by means of a link mechanism 40. The link mechanism 40 includes a first link member 42 being swingable around an axis 42c and having two arms 42a and 42b perpendicular to each other, and a second link member 48 pivotally connected to the arm 42b. The upper end of the arm 42a is pivotally connected to the right end of the spool member 34. The bottom end of the second link member 48 is pivotally connected to a spool member 54 of the second servo unit 50. Therefore when the spool member 54 of the second servo unit 50 is moved up or down, the spool member 34 of the first servo unit 30 is moved rightward or leftward.

The second servo unit 50 comprises a housing 51 having ports 51a, 51b to which hydraulic lines 102, 104 are connected respectively, and the spool member 54 vertically slidably fitted in the housing 51. The spool member 54 consists of a piston portion 54a, an end spool portion 54b coaxially extending downward and a rod portion 54c coaxially extending upward therefrom. The piston portion 54a is inserted into a cylinder hole 51c of the housing 51 and divides the space inside the cylinder hole 51c covered by a cover 55 into two chambers defining a upper and a lower cylinder chamber 52, 53. The end spool portion 54b is inserted into a rod hole 51d which is concentric with the cylinder hole 51c and extends downward.

A spool 58a of a top position detecting switch 58 is projected into a recess 54e formed on the end spool portion 54b. The spool 58a is pushed up along the tapered surface of the recess 54e when the spool member 54 is moved up. Therefore it can be found by the top position detecting switch 58a of the speed reduction ratio has become minimum since the pushed-up spool 58a turns the switch 58 on.

Further, the hydraulic lines 102, 104 communicate with the upper and lower cylinder chambers 52, 53 through the ports 51a, 51b. The spool member 54 is moved up or down by the difference of hydraulic forces applied to the piston portion 54a which are determined based on the difference of hydraulic pressures and of areas where the hydraulic pressures in the cylinder chambers 52, 53 are applied. The up and down motions of the spool member 54 are transmitted to the spool member 34 of the first servo unit 30 by the link mechanism 40 causing right and left motions of the spool member 34. In other words, the control of the hydraulic pressures supplied through the hydraulic lines 102, 104 enables control of the motion of the spool member 34 and the piston member 32 in the first servo unit 30 and also enables control of the swash plate angle of the hydraulic motor M and the displacement thereof. In fact, when the spool member 54 of the second servo unit 50 is moved up, the piston member 32 of the first servo unit 30 is moved rightward lessening the swash plate angle, the displacement of the hydraulic motor M and the speed reduction ratio.

The pressurized oil in the hydraulic line 102 connecting the port 51a with the upper cylinder chamber 52 is sent through hydraulic lines 101 and 102 from the delivery line of the charge pump 10 after its pressure is regulated by the charge pressure relief valve 12. The oil pressure in the hydraulic line 104 connecting the port 51b with the lower cylinder chamber 53 is obtained by regulating the oil pressure in a hydraulic line 103 (including an orifice 103a therein), which is branched from the hydraulic line 102, by the first and second duty-ratio-controlled solenoid valves 151 and 152. The first soilenoid valve 151 duty-ratio-controls the flow rate of the oil flowing from the hydraulic line 103 (having the orifice 103a therein) to the hydraulic line 104. The second solenoid valve 152 is disposed between a hydraulic line 105 branched from line 104 and a hydraulic line 106 communicating with the drain through an orifice 106a, and duty-ratio-controls drain-flow of the hydraulic oil from the line 104 in accordance with a given duty ratio.

As a result, to the upper cylinder chamber 52 a charge pressure regulated by the change pressure relief valve 12 is applied through the line 102, while to the lower cylinder chamber 53 is supplied from the line 104 a lower pressure than the charge pressure which is regulated by the first and second solenoid valves 151 and 152. In this manner, since the pressure applied area of the upper cylinder chamber 52 is smaller than that of the lower cylinder chamber 53, the forces due to the oil pressures in the cylinder chambers 52 and 53 acting on the spool member 54 keep their balance when the oil pressure in the lower cylinder chamber 53 is a specific value P1 which is smaller than the oil pressure Pu in the upper cylinder chamber 52 (Pu > P1). Therefore, when the oil pressure supplied into the lower cylinder chamber 53 from the line 104 is controlled by the first and second solenoid valves 151 and 152 so as to be higher than the above pressure P1, the spool member 54 is moved upward to yield a small swash plate angle of the hydraulic motor M, i.e., to yield a small speed reduction ratio, while when the oil pressure supplied into the lower cylinder chamber 53 from the line 104 is controlled so as to be smaller than the above pressure P1, the spool member 54 is moved downward to yield a relatively large swash plate angle of the hydraulic motor M, i.e., to yield a relatively large speed reduction ratio.

The two solenoid valves 151 and 152 are controlled by signals from the controller 100. By controlling the operations of the two solenoid valves 151 and 152 based on the signals from the controller 100, the actuations of the first and second ratio control servo units 30 and 50 are controlled, which results in the control of the displacement of the hydraulilc motor M, in other words, the control of speed reduction ratio.

Figure 3:
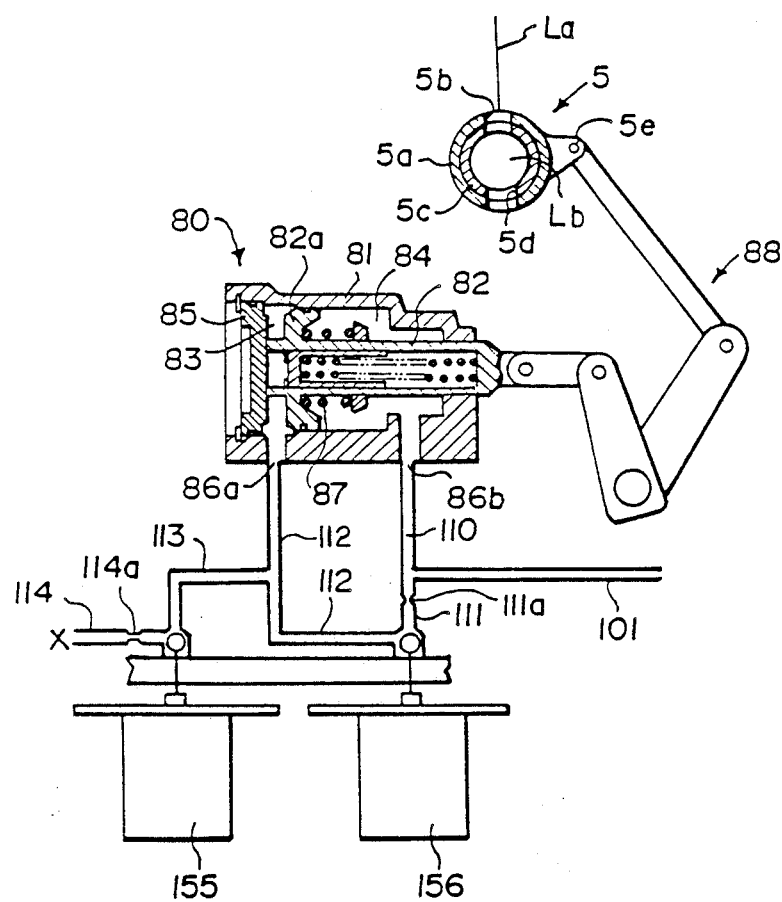
FIG. 3 is a sectional view of clutch servo unit.

The following is a detailed description of the construction of the clutch servo unit 80 based on FIG. 3. The clutch servo unit 80 consisits of a cylinder member 81, a piston member 82 inserted in the cylinder member 81 slidably to the right and left in FIG. 2, a cover member 85 fixed to cover the cylinder chamber into which the piston member 82 is inserted, and a spring 87 pushing the piston member 82 to the left in FIG. 2. A piston 82a on the piston member 82 divides the cylinder chamber 81 into a left cylinder chamber 83 and a right cylinder chamber 84, to which hydraulic lines 112 and 110 are respectively connected via respective ports 86a and 86b.

The hydraulic oil in the hydraulic line 110 is transferred from the charge pump 10 (whose delivery pressure is regulated by the charge pressure relief valve 12) through a hydraulic line 101, while the hydraulic oil in the hydraulic line 112 is transferred from the hydraulic line 101 through a hydraulic line 111, when the hydraulic oil is diverged into the line 111 and passes through an orifice 111a in the line 111, hydraulic oil pressure is controlled by the two duty-ratio-controlled solenoid valves 155 and 156. Here, the solenoid valve 156 is provided to control the flow rate of the hydraulic oil flowing from the line 111 (having the orifice 111a therein) to the line 112 based on the duty ratio signals, while the solenoid valve 155 is disposed between a hydraulic line 113 diverging from the line 112 and a hydraulic line 114 communicating with the drain through an orifice 114a, to control the flow of the hydraulic oil from the line 113 to the drain based on the duty signals.

Therefore, to the right cylinder chamber 84 via the line 110 is applied the charge pressure regulated by the charge pressure relief valve 12, while to the left cylinder chamber 83 is applied a pressure from the line 112 lower than the charge pressure, by the action of the aforesaid two solenoid valves 155 and 156. In this manner, the force applied on the piston member 82 from the right side (that is, a force due to the hydraulic pressure P1 in the right cylinder chamber 84 plus the force of the spring 87) balances with the force applied on the piston member 82 from the left side (that is, a force due to the hydraulic pressure P2 in the left cylinder chamber 83), even when P2 is lower than P1, because the area of the right cylinder chamber 84 subject to oil pressure is designed to be much smaller than that of the left cylinder chamber 83. Therefore, if the solenoid valves 155 and 156 control the hydraulic pressure (in the left cylinder chamber 83) supplied from the line 112 so as to be larger than the pressure P2, the piston member 82 will be moved to the right, while when the solenoid valves 155 and 156 control the hydraulic pressure in the left cylinder chamber 83 supplied from the line 112 so as to be smaller than the pressure P2, the piston member 82 will be moved to the left.

The movement of the piston member 82 to the left or right is transmitted to the clutch valve 5 through a link 88. The clutch valve 5 consists of a stationary member 5a having a first valve port 5b therein, and a rotary member 5c having a second valve port 5d rotatably inserted in the stationary member 5a. An arm 5e engaging with the rotary member 5c is connected to the aforesaid link 88, thus allowing a rotation of the rotary member 5c in accordance with the movement of the aforesaid piston member 82. When the rotary member 5c is rotated, the communication between the first and second valve ports 5b and 5d varies from "fully open" to "fully closed". When the piston member 82 is moved to the leftmost as shown in FIG. 2, the communication in the clutch valve 5 is "fully open", while as the piston member 82 moves to the right, the communication varies gradually to "fully closed".

Because the first valve port 5b communicates with the first line La and the second valve port 5d communicates with the second line Lb constituting the hydraulic closed-circuit, the variation in the communication between the aforesaid first and second valve ports 5b and 5d can change the opening degree of the seventh line Lg or the short-circuit line of the first and second lines La and Lb, thus effecting clutch control. In other words, based on the signals from the controller 100, duty-radio control of the solenoid valves 155 and 156 can perform a successful clutch control.

Opening control of the clutch valve 5 in the vehicle start will now be described referring to the flow chart in FIG. 4.

This clutch control starts with reading the accelerator opening $\theta acc$ based on the amount of accelerator pedal depression or on the throttle opening of engine, and with reading the vehicle speed V (S1). Then the basic reference clutch opening $\theta_{CLO1}$ corresponding to the accelerator opening $\theta acc$ is determined using the table in FIG. 5A (S2). In FIG. 5A a basic reference clutch opening $\theta_{CLO1}$ is previously set for each accelerator opening $\theta acc$ and each vehicle speed V, and therefore based on a vehicle speed V and an accelerator opening $\theta acc$ a basic reference clutch opening $\theta_{CLO1}$ for smooth engagement of the cluth can be calculated. In this context, a "0" degree of the accelerator opening $\theta acc$ corresponds to a "fully closed" condition of the engine throttle, while "80" degrees thereof corresponds to a "fully open" condition of the engine throttle. The basic reference clutch opening $\theta_{CLO1}$ is "90" degrees (maximum) when fully closed, and as the degree of opening decreases the clutch is shifted to the "open" side, and finally to "0" degree when fully opened.

Next, the actual clutch opening $\theta_{CL}$ is read, and an opening difference $d\theta_{CL1}$ ($=\theta_{CLO1}-\theta_{CL}$) between the basic reference clutch opening $\theta_{CLO1}$ and the actual clutch opening $\theta_{CL}$ is calculated (S3).

Concurrently with this calculation, a reference engine speed Neo corresponding to the accelerator opening $\theta acc$ is read from FIG. 5B (S4), to calculate speed difference dNe ($=Neo-Ne$) between the reference engine speed Neo and actual engine speed Ne (S5).

Then, it is judged whether the opening difference $d\theta_{CL1}$ is greater than a predefined opening $\theta_{CLG}$ (S6). A clutch opening correction $d\theta_{CL}$ corresponding to the engine speed difference dNe is obtained from FIG. 5C in case of $\theta_{CL1} > \theta_{CLG}$ or from FIG. 5D in case of $\theta_{CL1} < \theta_{CLG}$.

Figure 5D:
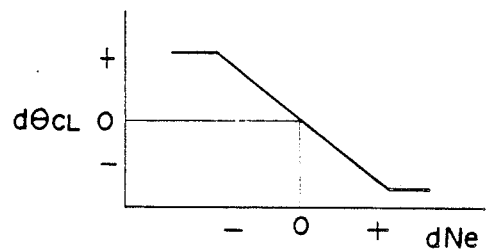

The opening correction $d\theta_{Cl}$ is negative (correction to open) when the speed difference dNe is positive, and is positive (correction to open) when the above speed difference is negative. In order to ensure proper engine speed and power, two different correction characteristics for the opening correction $d\theta_{CL}$ are prepared as shown in FIGS. 5C and 5D to give a different correction depending on the magnitude of the clutch opening difference $d\theta_{CL1}$. More specifically, if the opening difference $d\theta_{CL1}$ is greater than the predefined opening $\theta_{CLG}$, relatively small correction as shown in FIG. 5C is used, while if the opening difference $d\theta_{CL1}$ is smaller than that, relatively great correction as shown in FIG. 5D is used.

Then, the basic reference clutch opening $\theta_{CLO1}$ and the clutch opening correction $d\theta_{CL}$ are added together obtain corrected reference clutch opening $\theta_{CLO}$ (S9). By this correction in S9, if actual engine speed Ne is smaller than the reference engine speed Neo (if dNe is positive), the reference clutch opening is corrected in the close direction, while if actual engine speed Ne is greater than the reference engine speed Neo (if dNe is negative), the reference clutch opening is corrected in the open direction.

Figure 5E:
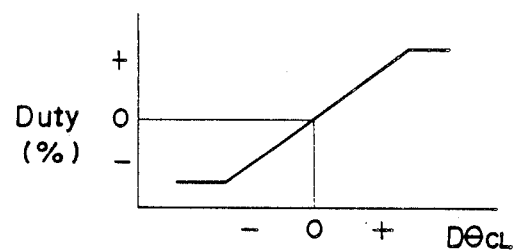

Then opening difference $D\theta_{CL}$ ($=\theta_{CLO}-\theta_{CL}$) between the corrected reference clutch opening $\theta_{CLO}$ and the actual clutch opening $\theta_{CL}$ is calculated (S10). From the graph in FIG. 5E, a solenoid valve duty ratio is determined to obtain clutch opening control speed corresponding to the opening difference $D\theta_{CL}$ (S11). The clutch opening control speed is proportional to the duty ratio. Therefore, as apparent in FIG. 5E, when the opening difference $D\theta_{CL}$ is positive, the control speed is given in the "clutch-engagement" direction (ON direction) to close the clutch valve, while when the opening difference $D\theta_{CL}$ is negative, the control speed is given in the "clutch-disengagement" direction (OFF direction) to open the clutch valve. When the opening difference $D\theta_{CL}$ is within a given range, the control speed tends essentially to be constant.

After the control speed is obtained as described above, the controller 100 outputs command signals to the solenoid valves 155, 156 so that the clutch valve 5 s actuated in accordance with the control speed (S12).

By the control as described above, when the engine throttle valve is rapidly opened in the vehicle start, the reference clutch opening is corrected in the closing direction, and the clutch opening speed is controlled in accordance with the difference of the reference clutch opening and the actual clutch opening. In this manner a desirable partial engaged clutch condition is obtained to perform a smooth engagement of the clutch.

Figure 5F:
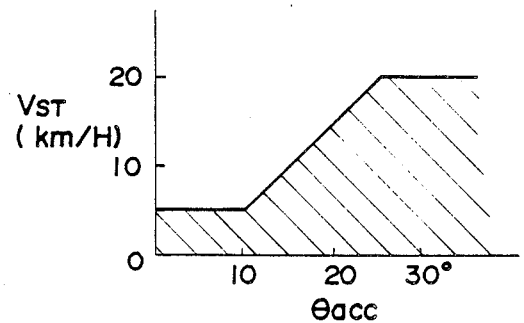

In this clutch control, it is desirable to start the ratio control (speed control) after the clutch has been fully engaged. For this reason, a ratio control permissive vehicle speed $V_{ST}$ corresponding to the accelerator opening $\theta$acc is read from the FIG. 5F (S13), and whether the actual vehicle speed V is larger than the permissive vehicle speed $V_{ST}$ is judged (S14). In case of $V > V_{ST}$, the speed control is permitted to start, and in case of $V < V_{ST}$, the speed control is not permitted to start until the actual vehicle speed V becomes equal to $V_{ST}$.

Figure 6:
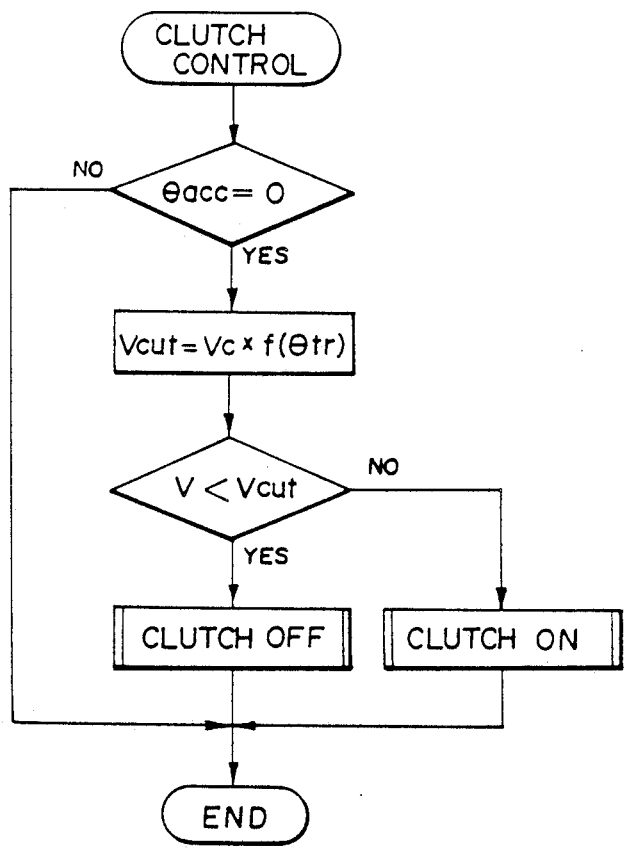
FIG. 6 is a flow chart illustrating clutch control according to the second embodiment of the invention.

In the above discussion, a clutch control which is to be operated when the clutch is shifted from an ON condition (engaged condition) to an OFF condition (disengaged condition) was described. Next, a description is given using the flow chart in FIG. 6 for OFF to ON clutch control which is to be operated for instance when the accelerator pedal opening becomes zero with the operator's foot released from the accelerator pedal during the vehicle running.

In the OFF to ON clutch control, first of all, whether the accelerator pedal opening $\theta$acc has been zero (fully closed) or not is detected. In other words, whether the accelerator pedal is released to decelerate or not is detected. When the opening $\theta$acc is not zero, since it can be identified that the driver does not have an intention of decelerating the vehicle speed, this control is terminated at this moment. When the accelerator pedal opening $\theta$acc is detected to be zero, the slant angle $\theta$tr of the swash plate 73 in the hydraulic motor M is detected to determine the speed reduction ratio of the continuously variable speed transmission T. Then, an actual operation initiating vehicle speed Vcut is calculated by multiplying a predefined basic operation initiating vehicle speed Vc by a coefficient $F(\theta tr)$ which is set based on the speed reduction ratio or the slant angle $\theta$tr. When the speed reduction ratio is big, the coefficient $f(\theta tr)$ is set to be small, while when the speed reduction ratio is small, the coefficient $f(\theta tr)$ is set to be big. Therefore, when the speed reduction ratio is big. the actual operation initiating vehicle speed Vcut is set to a lower value, while when the speed reduction ratio is small, an actual operation start speed Vcut is set to a higher value.

Then, whether the actual vehicle speed V detected by the vehicle speed detecting means is lower than the actual operation initiating vehicle speed Vcut is judged. The clutch is kept in the "ON" condition with the clutch valve 5 fully closed, until the actual vehicle speed V falls below the actual operation initiating vehicle speed Vcut, while the clutch is brought to the "OFF" condition with the clutch valve 5 opened as soon as the actual vehicle speed V falls below the actual operation initiating vehicle speed Vcut.

In general, concerning the control of a continuously variable speed transmission, since a big speed reduction ratio is employed when the vehicle speed is slow, and a small speed reduction ratio is employed as vehicle speed increases, it can be said that the vehicle speed is slow if the speed reduction ratio is big, and the vehicle speed is increased as speed reduction ratio is reduced. In the above control, when the accelerator pedal opening becomes zero for deceleration during running, the speed reduction ratio at the moment is detected. When speed reduction ratio is big, a clutch operation initiating vehicle speed for starting to open the clutch valve is set to a low value because the vehicle speed is low, and when the speed reduction ratio is small, a clutch operation initiating vehicle speed is set to a high value because the vehicle speed is high. In this manner, the control permits the clutch operation initiating vehicle speed to be set to a minimum value required for prevention of engine stall depending on vehicle speed, thus ensuring the prevention of engine stall even in a quick stop. And also, the minimized operation initiating speed can prevent the engine speed from increasing abruptly even if the accelerator pedal is depressed in the course of a slow reduction of vehicle speed.

The invention being thus described, it will be apparent that the same may be varied in many ways. Such variations are not to be regarded as a departure from the spirit and scope of the invention, and all such modification as would be obvious to one skilled in the art are intended to be included within the scope of the following claims.

What is claimed is:

1. A hydraulic continuously variable speed transmission in a vehicle comprising:
    a hydraulic pump driven by an engine;
    a hydraulic motor driven by hydraulic force from said pump;
    a hydraulic closed-circuit for hydraulically connecting the hydraulic pump and motor;
    a bypass line connecting a delivery side of said pump to a suction side thereof in said closed-circuit;
    a clutch valve for regulating the opening and closing of said bypass line;
    a ratio control actuator for varying the displacement of at least one of said hydraulic pump and said hydraulic motor to control a speed reduction ratio of said transmission;
    means for detecting said speed reduction ratio of said continuously variable speed transmission;
    means for detecting an accelerator opening; and
    means for detecting a vehicle speed of said vehicle,
    wherein during running, when said means for detecting an accelerator opening detects that said accelerator opening has been fully closed, said means for detecting said speed reduction ratio detects the speed reduction ratio at the moment, and then an operation initiating vehicle speed of said clutch valve is determined by a control means based on said detected speed reduction ratio, and
    when the vehicle speed detected by said means for detecting vehicle speed is reduced to said operation initiating vehicle speed, said clutch valve starts to open.

2. A hydraulic continuously variable speed transmission as defined in claim 1, wherein said operation initiating vehicle speed is set to a low value when said speed reduction ratio is high, while said operation initiating vehicle speed is set to a high value when said speed reduction ratio is low.

3. A hydraulic continuously variable transmission in a vehicle, said transmission having a hydraulic pump and a hydrualic motor interconnected by a closed hydraulic circuit, a first oil passage connecting an outlet of said pump with an inlet of said motor, and a second oil passage connecting an inlet of said pump with an outlet of said motor, comprising, bypass passage means for connecting said first oil passage with said second oil passage to short-circuit said transmission, clutch means for selectively varying said connection of said first oil passage and said second oil passage through said bypass passage means between a connected state, a disconnected state, and a partially connected state, according to a degree of opening of said clutch means, ratio detection means for detecting a speed reduction ratio of said transmission, accelerator opening detection means for detecting a degree of opening of an accelerator of said vehicle, vehicle speed detection means for detecting the speed of said vehicle, and clutch controller means for varying the degree of opening of said clutch means according to the degree of opening of said accelerator, said speed reduction ratio, and said vehicle speed, and for determining a clutch operation initiating speed, said clutch controller means operating to open said clucth means when said accelerator opening is in a fully closed position and said vehicle speed does not exceeed said clutch operation initiating speed.

4. A hydrualic continuously variable transmission according to claim 3, wherein said clutch operation initiating speed is determined based on said speed reduction ratio.

5. A method of controlling a clutch in hydraulic continuously variable transmission in a vehicle, said transmission being driven by an engine, said transmission having a variable speed reduction ratio, said transmission having a hydraulic pump and a hydraulic motor interconnected by a closed hydraulic circuit, said clutch being interposed in a bypass line for selectively and variably short-circuiting said closed hydraulic circuit by connecting an inlet port of said hydraulic pump and an outlet port of said hdyraulic pump according to a degree of opening of said clutch, comprising the steps of determining whether the degree of opening of an accelerator pedal of said vehicle is equal to zero, if said degree of opening of said accelerator pedal is equal to zero, then determining a clutch operation initiating speed based on the speed reduction ratio of said transmission, comparing said clutch operation initiating speed with an actual speed of said vehicle, and operating said clutch to open if said vehicle speed is less than said clutch operation initiating speed.

6. A method of controlling a clutch according to claim 5, wherein said clucth operation initiating speed is determined based on a predetermined basic operation initiating vehicle speed and said speed reduction ratio of said transmission.

7. A method of controlling a hyraulic continuously variable transmission in a vehicle, said transmission having a variable speed reduction ratio, said transmission being driven by an engine, said transmission having a hydraulic pump and a hydraulic motor interconnected by a closed hydraulic circuit, and a clutch interposed in a bypass line for selectively and variably short-circuiting said closed hydraulic circuit by connecting an inlet port of said hydraulic pump and an outlet port of said hydraulic pump according to a degree of opening of said clutch, comprising the steps of detecting an accelerator opening, reading a vehicle speed of said vehicle, reading a clutch opening, determining an engine speed of said engine, determining a clutch opening control speed according to said accelerator opening, said clutch opening, said vehicle speed, and said engine speed, controlling said clutch according to said clutch opening control speed, reading a ratio control permissive vehicle speed according to said accelerator opening, comparing said ratio control permissive vehicle speed with said vehicle speed of said vehicle, and controlling said speed reduction ratio of said transmission if said vehicle speed is greater than said ratio control permissive vehicle speed.

8. A method of controlling a hydraulic continuously variable transmission in a vehicle, siad transmission having a variable speed reduction ratio, said transmission being driven by an engine, said transmission having a hydraulic pump and a hydraulic motor interconnected by a closed hydraulic circuit, and a clutch interposed in a bypass line for selectively and variably short-circuiting said closing hydraulic circuit by connecting an inlet port of said hydraulic pump and an outlet port of said hydraulic pump according to a degree of opening of said clutch, comprising the steps of detecting an accelerator opening, reading a vehicle speed of said vehicle, determining a reference clutch opening according to said accelerator opening and said vehicle speed, reading a clutch opening, determining a first clutch opening difference according to said reference clutch opening and said clutch opening, determining a reference engine speed corresponding to said accelerator opening, calculating a speed difference based on said reference engine speed and an engine speed of said engine, determining a clutch opening correction according to said speed difference and a difference between said first clutch opening difference and a predefined clutch opening, determining a corrected reference clutch opening according to said reference clutch opening and said clutch opening correction, determining a second clutch opening difference according to said corrected reference clutch opening and said clutch opening, determining a clutch opening control speed according to said second clutch opening difference, controlling said clutch according to said clutch opening control speed, reading a ratio control permissive vehicle speed according to said accelerator opening, comparing said ratio control permissive vehicle speed with said vehicle speed of said vehicle, and controlling said speed reduction ratio of said transmission if said vehicle speed is greater than said ratio control permissive vehicle speed.

* * * * *